US008540959B2

(12) United States Patent
Ziegler et al.

(10) Patent No.: US 8,540,959 B2
(45) Date of Patent: Sep. 24, 2013

(54) BULK CUTTING OF CARBON NANOTUBES USING ELECTRON BEAM IRRADIATION

(75) Inventors: Kirk J. Ziegler, Gainesville, FL (US); Urs Rauwald, Bramen (DE); Robert H. Hauge, Houston, TX (US); Howard K. Schmidt, Cypress, TX (US); Richard E. Smalley, Houston, TX (US); Irene Morin Marek, legal representative, Houston, TX (US); W. Carter Kittrell, Houston, TX (US); Zhenning Gu, Sugar Land, TX (US)

(73) Assignee: William Marsh Rice University, Houston, TX (US)

( * ) Notice: Subject to any disclaimer, the term of this patent is extended or adjusted under 35 U.S.C. 154(b) by 255 days.

(21) Appl. No.: 12/299,634

(22) PCT Filed: May 7, 2007

(86) PCT No.: PCT/US2007/068363

§ 371 (c)(1), (2), (4) Date: Nov. 9, 2009

(87) PCT Pub. No.: WO2008/060680

PCT Pub. Date: May 22, 2008

(65) Prior Publication Data

US 2010/0284898 A1 Nov. 11, 2010

Related U.S. Application Data

(60) Provisional application No. 60/797,976, filed on May 5, 2006.

(51) Int. Cl.
*D01F 9/12* (2006.01)

(52) U.S. Cl.
USPC .................... 423/447.6; 423/447.1; 423/460; 977/742; 977/847

(58) Field of Classification Search
USPC .................... 423/447.1–447.3, 445 B, 447.6; 977/742–754, 842–848; 428/367
See application file for complete search history.

(56) References Cited

U.S. PATENT DOCUMENTS

| | | | | |
|---|---|---|---|---|
| 5,698,175 | A * | 12/1997 | Hiura et al. | 423/447.1 |
| 2006/0068096 | A1 | 3/2006 | Tang et al. | |

FOREIGN PATENT DOCUMENTS

| | | |
|---|---|---|
| JP | 2006 272374 | 10/2006 |
| WO | WO 2005/085132 | 9/2005 |

OTHER PUBLICATIONS

Zou, et al., Electron beam-induced structure transformation of single-walled carbon nanotubes, Carbon 2002; 40: 2282-2284.*

Smith, et al., Electron irradiation effects in single wall carbon nanotubes, J. Appl. Phys. 2001; 90(7): 3509-3515.*

Banerjee, et al., Rational Sidewall Functionalization and Purification of Single-Walled Carbon Nanotubes by Solution-Phase Ozonolysis, J. Phys. Chem. B 2002; 106: 12144-12151.*

Yuzvinsky, et al., Precision cutting of nanotubes with a low-energy electron beam, Applied Physics Letters 2005; 86: 053109.*

T.D. Yuzvinsky, et al., "Precision cutting of nanotubes with a low-energy electron beam", Appl. Phys. Lett., 86:2005, pp. 053109-1-053109-3.

M. Yudasaka, et al., "Effect of an organic polymer in purification and cutting of single-wall carbon nanotube", Appl. Phys. A, 71:2000, pp. 449-451.

I. Stepanek, et al., "Nano-mechanical cutting and opening of single wall carbon nanotubes", Chem. Phys. Lett., 331:2000, pp. 125-131.

F. Banhart, et al., "The formation, annealing and self-compression of carbon onions under electron irradiation", Chem. Phys. Lett., 269:1997, pp. 349-355.

S. Banerjee, et al., "Rational Sidewll Functionalization and Purification of Single-Walled Carbon Nanotubes by Solution-Phase Ozonolysis", J. Phys. Chem. B, 106:2002, pp. 12144-12151.

K.J. Ziegler, et al., "Controlled Oxidative Cutting of Single-Walled Carbon Nanotubes", J. Am. Chem. Soc., 127:2005, pp. 1541-1547.

J. Liu, et al., "Recent Advances in Methods of Forming Carbon Nanotubes", MRS Bulletin, 2004, pp. 244-250.

Z. Gu, et al., "Cutting Single-Wall Carbon Nanotubes through Fluorination", Nano. Lett., 2:2002, pp. 1009-1013.

S.R. Lustig, et al., "Lithographically Cut Single-Walled Carbon Nanotubes: Controlling Length Distribution and Introducing End-Group Functionality", Nano. Lett., 3:2003, pp. 1007-1012.

Y.-Q. Xu, et al., "Controlled Multistep Purification of Single-Walled Carbon Nanotubes", Nano. Lett., 5:2005, pp. 163-168.

F. Liang, et al., "A Convenient Route to Functionalized Carbon Nanotubes", 4:2004, pp. 1257-1260.

K.J. Ziegler, et al., "Cutting single-walled carbon nanotubes", Nanotechnology, 16:2005, pp. S539-S544.

S.J. Tans, et al., "Individual single-wall carbon nanotubes as quantum wires", Nature, 386:1997, pp. 474-477.

F. Banhart, "Irradiation effects in carbon nanotubes", Rep. Prog. Phys., 62:1999, pp. 1181-1221.

E.W. Wong, et al., "Nanobeam Mechanics: Elasticity, Strength, and Toughness of Nanorods and Nanotubes", Science, 277:1997, pp. 1971-1975.

F. Banhart, et al., "Cutting Single-Walled Carbon Nanotubes with an Electron Beam: Evidence for Atom Migration Inside Nanotubes", Small, 1:2005, pp. 953-956.

U. Rauwald, et al., "Chopping SWNTs into pieces: New Strategies for Cutting Carbon Nanotubes", Abstract No. 1589, NSTI nanotechnology and Trade Show, May 7-11, 2009, Boston, MA, Available Online at least May 5, 2006.

* cited by examiner

*Primary Examiner* — Daniel C McCracken
(74) *Attorney, Agent, or Firm* — Winstead PC

(57) ABSTRACT

According to some embodiments, the present invention provides a method for attaining short carbon nanotubes utilizing electron beam irradiation, for example, of a carbon nanotube sample. The sample may be pretreated, for example by oxonation. The pretreatment may introduce defects to the sidewalls of the nanotubes. The method is shown to produces nanotubes with a distribution of lengths, with the majority of lengths shorter than 100 tun. Further, the median length of the nanotubes is between about 20 nm and about 100 nm.

20 Claims, No Drawings

BULK CUTTING OF CARBON NANOTUBES USING ELECTRON BEAM IRRADIATION

CROSS-REFERENCE TO RELATED APPLICATION

This application claims priority to and benefit of U.S. Provisional Application Ser. No. 60/797,976, filed on May 5, 2006, entitled: BULK CUTTING OF CARBON NANOTUBES USING ELECTRON BEAM IRRADIATION, by inventors Kirk J. Ziegler, et al., hereby incorporated herein by reference.

STATEMENT OF GOVERNMENT SPONSORSHIP

The present invention was made with government support under Air Force Office of Scientific Research grant number FA9550-04-1-0452, awarded by the U.S. Department of Defense; NASA Quantum Conductors grant number NNJO5HB73C, awarded by the National Aeronautics and Space Administration; and Office of Naval Research DURINT grant number N00014-01-1-0789, awarded by the U.S. Department of Defense. The U.S. Government has certain rights in this invention.

FIELD OF THE INVENTION

The present invention relates in general to a method for cutting nanotubes, more particularly to a method that involves electron beam irradiation.

BACKGROUND OF THE INVENTION

Carbon nanotubes are the focus of intensive study for a variety of applications, for example electronics, materials science, and medicine. Carbon nanotubes can be visualized as cylinders of rolled up graphene sheets, which may be capped so as to close the tubes. Nanotubes are typically synthesized with polydisperse micrometer lengths and tend to be bundled into macroscopic ropes. However, many applications are expected to require short undamaged individual nanotubes in the range of 20 nm to 100 nm in length. The solubility of carbon nanotubes increases and makes them easier to process, e.g., into composite materials. Carbon nanotubes of particular length can be designed to penetrate biological systems or can be integrated into electronic devices where a precise length and placement on a substrate are critical.

In particular, in materials science applications, the solubility of nanotubes varies with their length, with solubility tending to increase with shorter length. Further, shorter nanotubes tend to have less effect on viscosity. Thus, it is easier to process short nanotubes into composite materials. Further, in electronics applications, short nanotubes are desirable for integration into electronic devices where tubes of precise length are placed in well-define locations on a substrate. Still further, in medical applications, short nanotubes are better able to penetrate biological systems.

Thus, there remains a need for providing a method for cutting nanotubes, in particular a method that produces nanotubes with a length less than 100 nm.

BRIEF DESCRIPTION OF THE INVENTION

These and other features and advantages of the invention will be apparent to those skilled in the art from the following detailed description of various embodiments, taken together with the accompanying claims, in which:

According to some embodiments, the present invention provides a method for attaining short carbon nanotubes utilizing electron beam irradiation, for example, of a carbon nanotube sample. The sample may be pretreated, for example by oxonation. The pretreatment may introduce defects to the sidewalls of the nanotubes. The method is shown to produces nanotubes with a distribution of lengths, with the majority of lengths shorter than 100 nm. Further, the median length of the nanotubes is between about 20 nm and about 100 nm.

DETAILED DESCRIPTION OF THE INVENTION

A new process to attain short carbon nanotubes has been developed. It utilizes electron beam irradiation of a carbon nanotube sample in an inert atmosphere to introduce sidewall modifications causing cutting/shortening of nanotubes.

When a high energy electron source is used to irradiate functionalized or otherwise non-pristine nanotubes, localized heating, displacement and ionization events lead to deformation and damage, eventually leading to carbon bond breakage and cutting of the nanotube. This principle is the basis for new cutting processes that Applicants have developed. In particular, Applicants have shown that nanotubes subjected to ozonolysis can be further cut by irradiating them in an inert atmosphere (e.g., nitrogen gas). Nanotubes of various lengths can be produced by altering the cutting conditions. Both sidewall modification and irradiation time are the key parameters to controlling nanotube length.

Nanotubes may be used as obtained from various known synthetic methods. Applicants note that raw carbon nanotubes and purified carbon nanotubes are each available commercially, for example from Carbon Nanotechnologies, Inc. (CNI).

Applicants have demonstrated the cutting process with raw single-walled carbon nanotubes synthesized by the HiPco process® as the starting material. An optional purification step removes metals and other impurities (such as fullerenes) from carbon nanotubes. Then, the side-wall defects and functional groups are introduced, as described above, prior to e-beam irradiation. As described above, in Applicants' experiments, ozonation, also termed herein ozonolysis, of carbon nanotubes was most useful for this purpose. As described above, nanotubes subjected to ozonolysis can be further cut by irradiation.

According to some embodiments, a method for cutting nanotubes involves modification, irradiation, and an optional work-up. Modification of nanotube sidewall (e.g., derivatization, damage) may be so as to alter the nanotubes ability to dissipate energy. Modification may involve functionalization. Best results were achieved in Applicants' experiments, using ozonolysis for this purpose. Starting nanotubes may be raw or purified. Bulk electron beam irradiation of nanotube material may be under inert gas conditions. An optional work up may involve further acid treatments or annealing process. Thus, according to some embodiments, the optional work-up involves treatment with piranha solution.

Applicants note that ozonation epoxidizes SWNTs causing cutting. The remaining epoxides of the nanotube can be exploited by e-beam irradiation. As described above, e-beam irradiation occurs in the presence of nitrogen. Irradiation may result in the production of carbon monoxide and/or carbon dioxide, as a byproduct of bond breakage producing defects as a vacancy, thereby aiding cutting. While not wishing to be limited by theory, Applicants note that pristine SWNTs may be characterized by high charge transfer and low defect probability. In contrast, functionalized SWNTs may be characterized by local charging and high atom knock-out probability.

According to exemplary embodiments, as described herein, the irradiation is performed in aluminum sample holders designed by Applicants. About 10 g of dried nanotube material is added corresponding to a bed height of about 1 inch. The holder is purged by nitrogen gas. The nitrogen stream provides sample cooling and prevents oxidative crosslinking reactions. An oxygen/water removal filter was mounted. The sample temperature is monitored by three thermocouples in the sidewall of the container. The samples were are irradiated by a 3 MeV electron beam at an average current of 0.102 mA. Applicants' work suggests that irradiation times between 5 and 15 min allow control of the lengths achieved. However, this tends to depend on the e-beam source and operating conditions. It is within the skill of one of ordinary skill in the art to vary the irradiation time according to the e-beam source and operating conditions.

It will be understood that while the examples are described herein with respect to single-walled carbon nantoubes (SWNTs), other suitable carbon nanotubes may be used.

It will be understood that while functionalization is described herein with respect to ozonation, other suitable types of chemical functionalization (covalent or non-covalent) are contemplated by Applicants. For example, Applicants note that cutting was achieved in experiments using sulfonation as the functionalization procedure.

Applicants believe that novel aspects of the present process include, but are not limited to, the following. This is the first report on using high energy electron beam irradiation for bulk cutting of carbon nanotubes. Further, the development of new 2 or more step cutting strategies is described. By combining other cutting strategies such as acid or ozone cutting with subsequent high energy electron irradiation new nanotube derivatives and especially further shortened nanotubes are achieved. Still further, the development of new 2 or more step cutting strategies is described. By combining other cutting strategies such as acid or ozone cutting with subsequent high energy electron irradiation new nanotube derivatives and especially further shortened nanotubes are achieved. Yet further, the electron beam potentially drives off earlier introduced functional groups, making it easier to obtain undamaged nanotube product. Still yet further, cutting with electron beam irradiation is tunable by parameters such as irradiation time, energy of the electron beam and environment. Applicants have found that inert gas provides a suitable environment to prevent aggregation or crosslinking of nanotubes.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention. Further details are in the examples which follow.

The description in the following examples, is based at least in part on a prepublication manuscript, included as an attachment with the U.S. Provisional Application Ser. No. 60/797,976, filed on May 5, 2006, hereby incorporated herein by reference. This manuscript has not yet been submitted for publication as of the filing date of the present application, May 7, 2007.

EXAMPLES

Single-walled carbon nanotubes as described herein are exemplary of carbon nanotubes.

The raw single-walled carbon nanotubes used were synthesized by the HiPco process (lot 161.2). Following a purification process developed by Xu' et al. (Xu et al., Nanoletters 1997, vol. 269 (3-4), pp. 349-355), metals and fullerenes were removed. The final metal content was approximately 2 wt % as determined by thermo-gravimetric analysis (TA Instruments Q500-TGA).

Ozonation

The purified nanotubes were dispersed in perfluoropolyether (PFPE) solvent (Galden HT90) at a concentration of 3.25 g/L. This mixture was then homogenized to achieve a good suspension before introducing ozone. Ozone was generated by passing an oxygen stream through an ozone generator (Ozone Services OL80) yielding an ozone concentration of approximately 3.7 wt % ozone. The ozone was bubbled through the SWNT suspension in a sealed three neck flask for two hours. After ozonolysis, the system is purged with oxygen gas for 30-60 minutes. The suspension was then transferred to a separation funnel and the nanotubes were extracted into ethanol allowing the PFPE to be removed for distillation and reuse. To the ethanol/SWNT disperson, a 50:50 mixture of hexane and ethyl ether was then added to induce flocculation. The mixture was left to settle for 30-60 minutes and then filtered through a 0.2 μm PTFE membrane, washed with ether, and vacuum dried[11].

Irradiation

The e-beam source used in this study is a pulsed linear accelerator located at the National Composite Center in Dayton, Ohio that generates a high energy ($3\times10^6$ eV) beam of electrons at near relativistic speeds in a high vacuum chamber. It is known in the art and described, for example in D. Klosterman, SAMPE 2003 Conference Proceedings. Aluminum sample holders were designed to allow a bed height of 1 inch or approximately 10 g of nanotube pearls (see FIG. 3). The tubes were vacuum dried at 50° C. and purged by $N_2$ gas stream at 25 LPM in the aluminum holder. The $N_2$ stream was utilized during the irradiation experiments to maintain the sample temperature below 100° C. in an inert gas stream. When SWNTs were irradiated in an aerobic atmosphere (air), SWNT aggregates form that cannot be processed further. This is likely due to crosslinking of SWNTs. For this purpose an oxygen/water removal filter was used to ensure purity of the inert gas. The sample temperature was monitored by three thermocouples in contact with the sidewall of the container. Dosimetry tests were performed to locate and calibrate the beam. The samples were irradiated at 170 pps with approximately 120 mA per pulse leading to an average current of about 0.102 mA. Nanotube samples were exposed to 220 (5 minutes), 660 (15 minutes) and 1980 (45 minutes) kGy. For our setup this corresponds to a fluence ranging from $10^{16}$ to $10^{17}$ electrons per $cm^2$. The irradiated samples were then collected for further experiments and analysis.

Piranha Treatment

We also investigated the use of piranha solution to exploit defect sites remaining after the irradiation and to work up the irradiation product. For this 100 mg SWNT sample in 100 mL concentrated sulphuric acid (96%) were stirred for 20 minutes. Then ammonium peroxydisulfate was added to generate the highly reactive Caro's acid. The mixture was stirred for two hours and quenched by addition of water (5:1) while cooling it in an ice bath. The solution was then washed in a separation funnel with ethanol and water until pH neutral. It was then filtered through 0.1 μM polycarbonate membrane and washed with hexane. The product was collected and dried.

Characterization

To determine the length of the nanotubes, a length analysis protocol (REF length analysis) developed in Applicants' lab was followed. A small amount of sample (20 mg) was functionalized with dodecyl groups using a Birch type reaction in a lithium/ammonia environment (Liang, et al. Nano Letters 2004, vol. 4(7), pp. 1257-1260. It was then readily dispersible on cleaved mica sheets yielding a large quantity of individual SWNTs. They were imaged by tapping mode AFM (Digital Instruments Nanoscope IIIA). Length analysis was done using Simagis software. A minimum of 800 nanotubes were measured for statistically relevant results.

Multiple Raman spectra of solid sample powders were recorded on a Renishaw MicroRaman System 1000 using a 70 nm excitation laser. The data was normalized to the g peak and averaged to reduce noise. Also, SEM images were obtained using a JEOL 5300 microscope. X-Ray photoelectron spectroscopy was carried out on a PHI Quantera XPS.

Results and Discussion

Pristine nanotubes do not show a desired cutting effect after electron beam exposure. Irradiation of pristine tubes is limited to low probability direct knock-on events due to the fast dissipation of ionization events. Thus the use of ozone functionalized nanotubes in irradiation experiments should allow ionization and sufficient activation energy to induce vacancies in the nanotube sidewall via evolution of CO and $CO_2$. Therefore, nanotubes are cut in two steps. Initially, cutting occurs with ozone functionalization and finally with electron beam irradiation.

SWNT lengths were sorted into bins of 30 nm size and are displayed in histograms. The histograms can be well-represented by simple exponential decay fits according to $$y(x) = A\exp\left(-\frac{x}{B}\right) + y_0$$

with $R^2$ values consistently above 0.9 after chi-square minimization. The length was evaluated after every processing step and a shortening of the sample can be observed throughout the entire process including purification, ozonation and irradiation (Table 1). With regards to Table 1, the number median is the conventional median of the distribution of lengths. The length median is a mass weighted median. The sum of all lengths in a sample is computed. The lengths in each histogram are added up until you get half the total length. Whatever length that is, is the length median. That is, the length median is the length associated with the histogram at which half the total length is reached.

TABLE 1

Weight median, number median and interquartile range for all SWNT samples.

| Description | Length median (nm) | Number median (nm) | IQR 75 (nm) |
|---|---|---|---|
| Raw SWNTs | 217 | 83 | 166 |
| Purified | 156 | 81 | 134 |
| Ozonated | 148 | 63 | 119 |
| Irradiated, 5 min | 126 | 59 | 119 |
| Irradiated, 15 min | 106 | 59 | 100 |
| Irradiated, 45 min | 106 | 56 | 94 |

The purification procedure through $SF_6/O_2$ oxidation cuts some of the larger tubes as shown by a drop in the length median by 60 nm. However, the number median stays roughly the same (81 nm) and drops significantly only after ozonation (63 nm). Ozonation causes the biggest shift in the length distributions toward shorter tubes and is a vital step of the cutting process. On the one hand the sidewalls of the nanotubes are efficiently functionalized by ozone. This is evident from XPS and Raman data. The functionalization is at the same time an excellent preparation for the subsequent electron beam irradiation.

Each sample was exposed to three different irradiation dosages between $10^{16}$-$10^{17}$ $e^-/cm^2$ by varying the exposure time. The results of length measurements for different exposure times are listed in Table 1. Longer irradiation times correspond to shorter SWNTs. However, after the initial five minutes a lengthening of the samples occurs. This is shown for ozonated SWNTs but was also observed for sulfonated ($SWNT\text{-}SO_3H$). We believe this is due to an etching effect due to residual adsorbed gas causing short SWNTs to fall below our detection limit of 30 nm, i.e., the size distribution is shifted. In order to cut a (10,10) tube 10 bonds need to be broken. This makes etching from the nanotube end only initially a visible effect. As defect formation progresses and bonds around the circumference of the tube are consumed, cutting occurs and dominates any changes in length. Already after 15 minutes clearly shortened SWNTs are observed. Finally, 45 minute irradiation leads to only marginally shorter SWNTs. Applicants speculate that three times the time did not produce three times the cutting due to a postulated lack of oxygen/epoxy functionalities on SWNT sidewall slowing down the irradiation effect.

Applicants also attempted to exploit the vacancies on the SWNTs by a piranha cutting step after irradiation. However, the formation of intractable aggregates is observed for the previously ozonated SWNTs.

In conclusion, a high energy electron beam was established as a tool for cutting functionalized single-walled nanotubes. It was demonstrated that ozonated SWNTs can be further cut by electron beam irradiation. While irradiation of pristine SWNTs did not cause significant cutting due to charge dissipation, the irradiation of ozonated SWNTs results in localized heating events that evolve CO and/or $CO_2$ as the reaction progresses. This disintegration led to the formation of holes in the nanotube sidewall. Applicants note that as these vacancies grow in number cutting occurs. Applicants further note that the amount of cutting can be controlled by the electron dosage. The combination of ozonation and irradiation is attractive, as Applicants were able to achieve tubes of a median length of about 60 nm with 75% of them shorter than 100 nm. the majority of lengths shorter than 100 nm. The distribution with 75% of nanotubes shorter than 100 nm is illustrative of distributions with the majority of nanotubes shorter than about 100 nm. The median length of about 60 nm is illustrative of a median length between about 20 nm and about 100 nm.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method for bulk cutting of carbon nanotubes, comprising:

(a) functionalizing the carbon nanotubes; and (b) bulk irradiating the functionalized carbon nanotubes with an electron beam, wherein the irradiating occurs in an inert atmosphere, and wherein the irradiating causes the bulk cutting of the carbon nanotubes.

2. The method according to claim 1, wherein the electron beam is a high energy electron beam.

3. The method according to claim 2, wherein the energy of the high energy electron beam is at least about 3 MeV.

4. The method according to claim 1, wherein (b) proceeds for at least about 5 min.

5. The method according to claim 1, wherein (a) comprises functionalizing the carbon nanotubes with ozone.

6. The method according to claim 5, wherein (a) comprises bubbling ozone through a suspension of the carbon nanotubes.

7. The method according to claim 1, wherein the inert atmosphere comprises nitrogen gas.

8. The method according to claim 1, wherein (a) includes introducing side-wall defects to the carbon nanotubes.

9. The method according to claim 1, wherein the cut carbon nanotubes have a median length between about 20 nm and about 100 nm.

10. The method according to claim 1, wherein a majority of the cut carbon nanotubes are shorter than about 100 nm.

11. The method of claim 1, wherein the irradiating causes the bulk cutting of about 10 grams of carbon nanotubes.

12. A method for bulk cutting of carbon nanotubes, comprising:

(a) functionalizing the sidewalls of the carbon nanotubes so as to damage the sidewalls; and (b) bulk irradiating the functionalized carbon nanotubes with an electron beam, wherein the irradiating occurs under inert gas conditions, and wherein the irradiating causes the bulk cutting of the carbon nanotubes.

13. The method according to claim 12, wherein (a) comprises functionalizing the carbon nanotubes with ozone.

14. The method according to claim 13, wherein (a) comprises bubbling ozone through a suspension of the carbon nanotubes.

15. The method according to claim 12, wherein the inert gas conditions comprise nitrogen atmosphere conditions.

16. The method according to claim 12, wherein the method produces cut carbon nanotubes having a median length between about 20 nm and about 100 nm.

17. The method according to claim 12, wherein a majority of the cut carbon nanotubes are shorter than about 100 nm.

18. The method according to claim 12, wherein the electron beam is a high energy electron beam.

19. The method according to claim 18, wherein the energy of the electron beam is at least about 3 MeV.

20. The method of claim 12, wherein the irradiating causes the bulk cutting of about 10 grams of carbon nanotubes.

* * * * *

UNITED STATES PATENT AND TRADEMARK OFFICE

CERTIFICATE OF CORRECTION

PATENT NO. : 8,540,959 B2
APPLICATION NO. : 12/299634
DATED : September 24, 2013
INVENTOR(S) : Ziegler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this
Fifteenth Day of September, 2015

Michelle K. Lee

Michelle K. Lee
*Director of the United States Patent and Trademark Office*